United States Patent [19]

Bruno et al.

[11] Patent Number: 5,473,975
[45] Date of Patent: Dec. 12, 1995

[54] CONVEYOR TOASTER OVEN

[75] Inventors: Adrian A. Bruno, Rolling Meadows; William S. Schjerven, Sr., Schaumburg; Robert Nevarez, Kirland, all of Ill.

[73] Assignee: Middleby Marshall Inc., Elgin, Ill.

[21] Appl. No.: 382,886

[22] Filed: Feb. 2, 1995

[51] Int. Cl.[6] ..................................................... A47J 37/08
[52] U.S. Cl. ............................ 99/335; 99/373; 99/386; 99/400; 99/401; 99/443 C; 99/446; 99/447; 99/476; 219/388; 219/400
[58] Field of Search .......................... 99/325, 334–336, 99/372, 373, 378, 385, 386, 389–391, 400, 401, 443 R, 443 C, 444–446, 447, 450, 473–476; 219/388, 400; 126/21 A; 426/243, 523

[56] References Cited

U.S. PATENT DOCUMENTS

| | | | |
|---|---|---|---|
| 3,665,842 | 5/1972 | Visitacion | 99/389 |
| 4,044,660 | 8/1977 | Montague et al. | 99/326 |
| 4,226,176 | 10/1980 | Maachi | 99/387 |
| 4,281,594 | 8/1981 | Baker et al. | 99/401 |
| 4,386,558 | 6/1983 | Holman et al. | 126/21 A |
| 4,421,015 | 12/1983 | Masters et al. | 99/400 |
| 4,667,589 | 5/1987 | Bishop | 99/386 |
| 4,964,392 | 10/1990 | Bruno et al. | 99/443 C |
| 5,033,366 | 7/1991 | Sullivan | 99/443 C |
| 5,197,375 | 3/1993 | Rosenbrock et al. | 219/388 |
| 5,239,917 | 8/1993 | Lutkie et al. | 99/386 |
| 5,277,105 | 1/1994 | Bruno et al. | 99/476 |

Primary Examiner—Timothy F. Simone
Attorney, Agent, or Firm—Laff, Whitesel, Conte & Saret, Ltd.

[57] ABSTRACT

A conveyor toaster has air chambers at opposite sides and at the top of the oven for reducing surface temperatures of the out side housing panels of the oven which a worker might touch. A wire link conveyor belt extending through the oven and carrying food products at a speed which toasts those food product during their dwell time within the oven. The conveyor belt is tensioned by a spring bias so that a force directed against the spring bias creates a slack which enables an installation, removal, and reinstallation of the conveyor belt. A heating element is supported at a height above the belt which may be during manufacturing to accommodate the height of a food product conveyed by the conveyor. A loading rack at the front of the housing has two stable positions for enabling either batch loading or continuous loading.

16 Claims, 5 Drawing Sheets

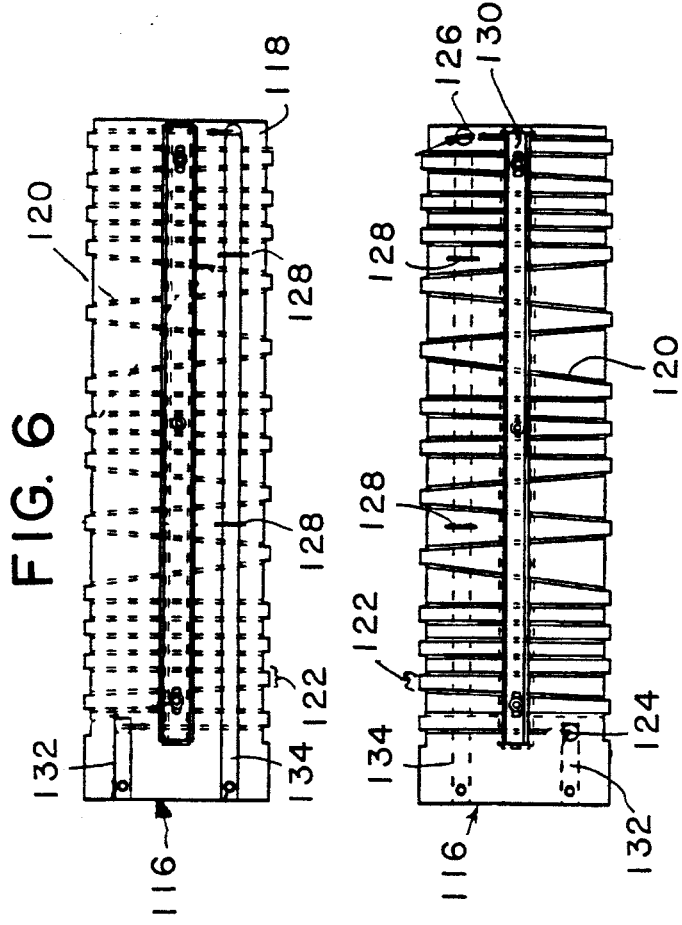
FIG. 6
FIG. 7
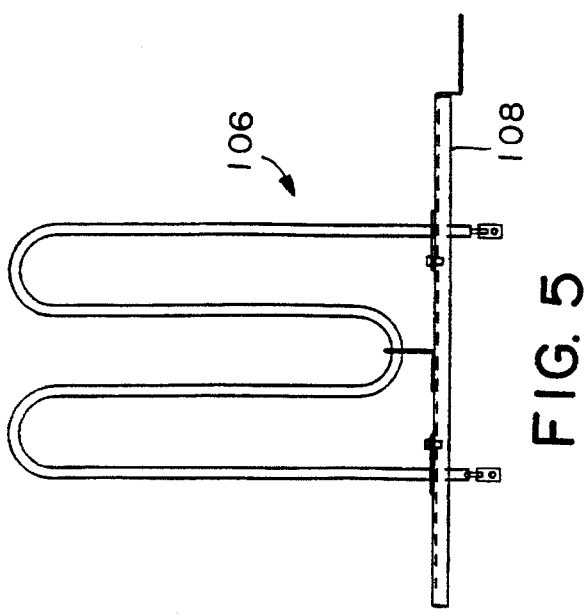
FIG. 5
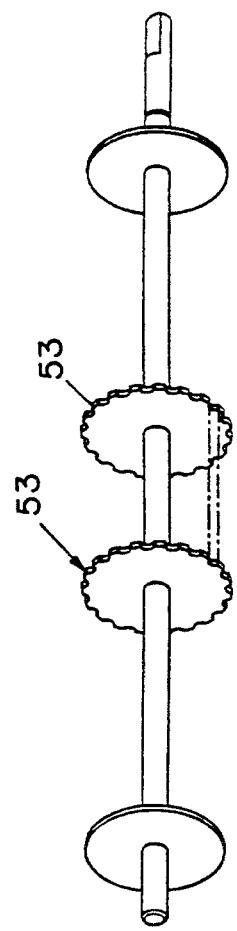
FIG. 8

CONVEYOR TOASTER OVEN

This invention relates to toasters and more particularly to toasters having conveyors which carry food products through an oven at a rate of speed which leads to as nearly perfect a toasting as possible on a mass production basis.

There are many existing toasters; however, there is room for a substantial improvement. A few of these prior art toasters are shown in U.S. Pat. Nos. 3,665,842; 4,044,660; 4,226,176; 4,386,558; and 4,465,701.

Some of the desired improvements are directed to a need for a more flexible design wherein a manufacturer may provide toasters which meet a variety of customers requests without requiring any appreciable redesign or change of tooling or in production procedures. Examples of these various customer requests are: continuous toasting vs. batch toasting, toasting of high or tall produces (such as muffins), medium height products (such as bagels), and low height products (such as bread). A manufacture would want to respond to these and similar requests at a minimum of costs. On the other hand, a customer could be seriously injured if given the opportunity to modify the oven on his own.

These varieties of food products lead to another type of problem as where, say a peak on a high muffin is burned while the center of the muffin is hardly warm because the heating element generates too much heat of an unduly short wave length, and burns the surface before cooking the center of the product. On one toasting occasion, perhaps a full load of food products filling the entire conveyor passes through the oven to soak up a substantial amount of heat during the toasting process. On another toasting occasion, perhaps a half load or only a few food products pass through the oven to soak up a small amount of heat during the toasting process. Hence, there should be some way of adjusting both the amount and the nature of heat produced.

Yet, another problem relates to the wave length of the heat being used. Heat having a short wave length acts faster and creates a less desirable toasted product than heat having a long wave length would create. Many toasters use quartz tube heating elements because they heat up very quickly, but this type of heating element produces the undesirable very short wave lengths which may burn before they toast unless they are controlled extremely carefully. Also, a quartz tube heating element may be broken, as during rough handling, for example.

Still further, a problem centers around the surface heat on the toaster housing. In one sense, such a toaster housing always is very likely to be hot. On the other hand, any reduction in the housing surface temperature tends to improve the safety of the work area. Therefore, the greater the surface temperature reduction, the greater the improvement.

Accordingly, an object of the invention is to provide new and improved conveyor toaster ovens. Here, an object is to provide ovens which respond to and overcome the above stated and similar problems.

In keeping with an aspect of the invention, a conveyor toaster oven has side panels with air flow chambers which tend to carry heat away from housing surfaces. A simple factory adjustment of a heating element bracket changes the location of a heating element and thereby places it at a height which is selected to accept and toast certain products, such as muffins, bagels, bread toast, etc. A two position entry rack at the input of the toaster oven adapts the oven for either batch or continuous loading. A simple adjustment of conveyor speed enables the toaster to toast a few or many food product items and still maintain the desired level of "golden brown" toasting.

A preferred embodiment is shown in the attached drawings in which:

FIG. 5 is a plan view of a lower heater;

FIG. 6 is a plan view of the upper side of an upper heater;

FIG. 7 is a plan view of an underside of the upper heater of FIG. 6; and

FIG. 8 is a perspective view of a conveyor belt drive.

Figure 1:
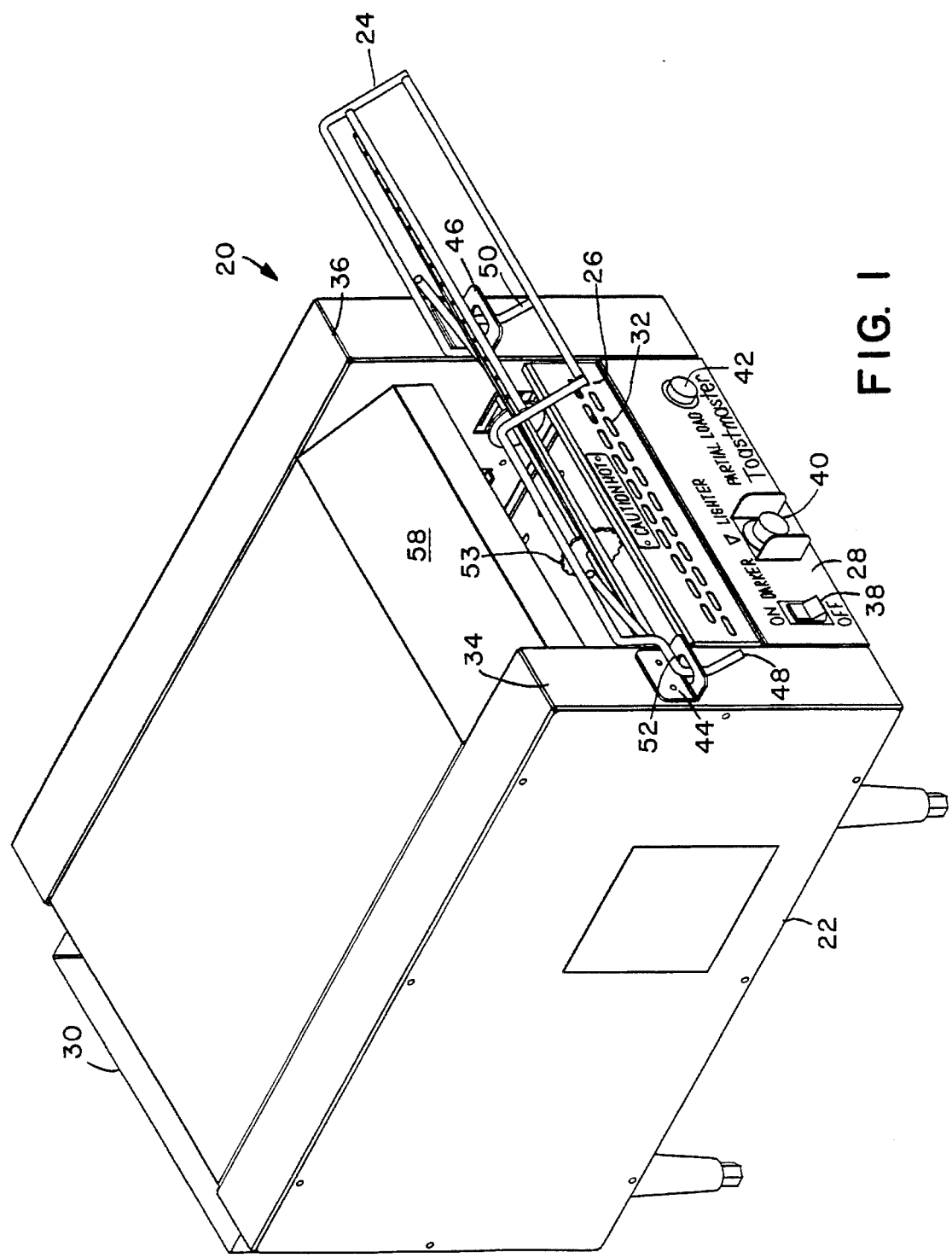
FIG. 1 is a perspective view of the inventive toaster with its entry rack in a loading position for enabling a continuous production of toast.

The conveyor toaster oven 20, (FIG. 1) includes a housing 22, an entry rack 24, a crumb tray 26, a control panel 28, and a rear safety shield 30 to protect both the workers and the oven and may have an internal insulation shield 31. The front (FIG. 2) of the crumb tray 26 has a number of openings 32 which break up any pattern of heat which might otherwise occur within the metal of the panels forming the crumb tray. The bottom has embossments 33 to reduce the amount of heat flow from the crumb tray to the control compartment. The housing 22 has air flow chambers 34, 36 (FIG. 1) on opposite sides, which tend to maintain cooler outer and top 58 housing walls that might be touched by workers during normal operation speed.

The control panel 28 includes off/on switch 38, a speed control knob 40, optionally a conveyor speed special "partial load" switch 42. An operation of switch 42 adjusts the conveyor speed to increase the dwell time of the product within the oven. Therefore, switch 42 is not manipulated to decrease the conveyor speed for large loads and is manipulated to increase the conveyor speed and reduce the product's dwell time within the oven for smaller loads. A conveyor speed control relay 43 may adjust the dwell time of a product within the oven and therefore to lengthen or shorten the predetermined toasting time.

Figure 2:
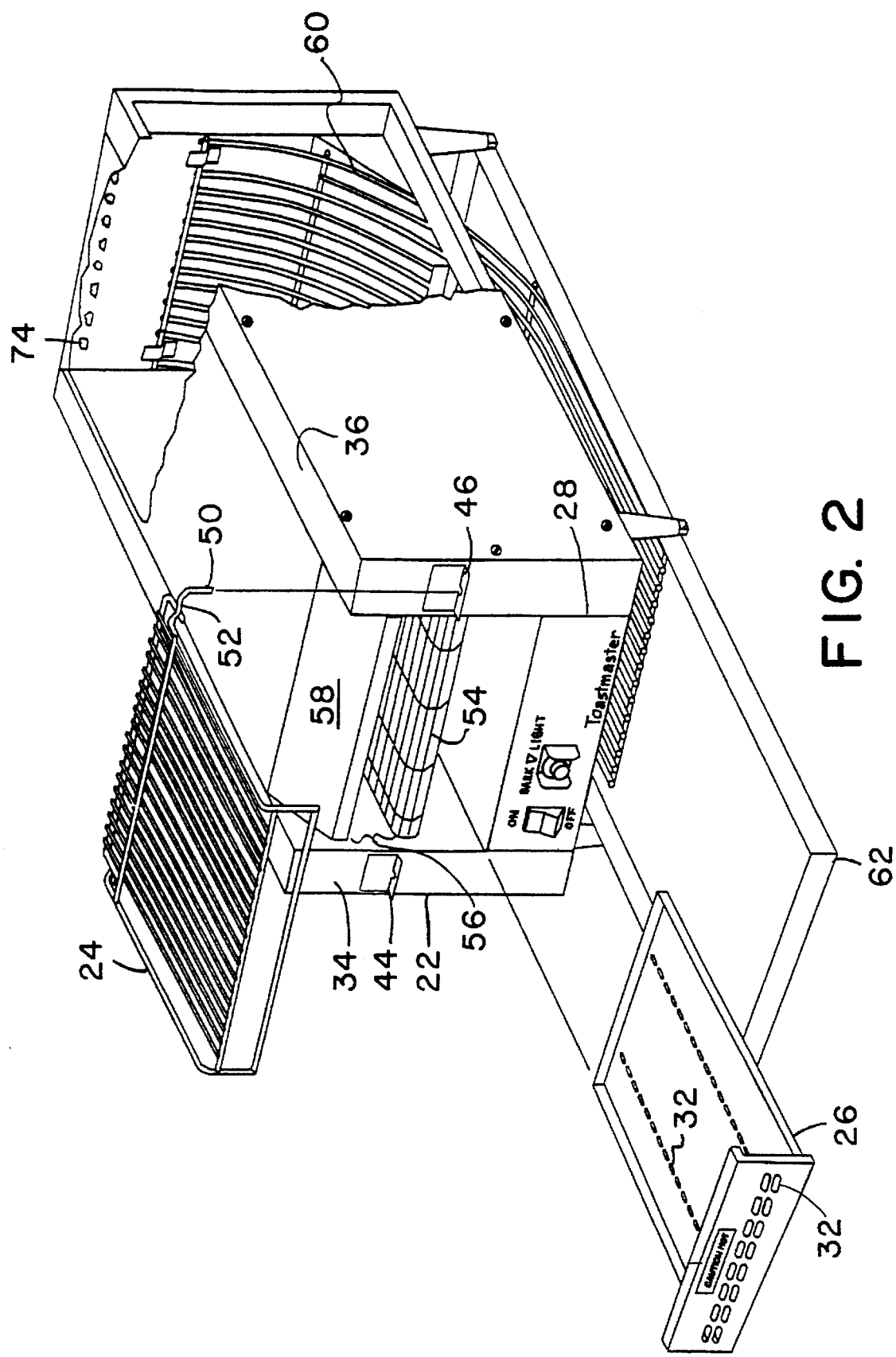
FIG. 2 is a similar prospective view of the toaster with the entry rack in a staging position for batch loading of toast, and with part of the housing cut away to show the path followed by the food product as it travels through and out the toaster.

On opposite sides of the front of the oven are two entry rack 24 support brackets 44, 46. The entry rack 24 has two wires with free end 48, 50 which fit into and are supported by the brackets 44, 46. Each of these free ends 48, 50 also has an offset section 52 which rests stably on the individually associated brackets 44, 46 to hold the entry rack 24 in its elevated, continuously loading position, as shown in FIG. 1. With the entry rack 24 in this loading position, all that the worker has to do is to fill it with slices of bread, or the like, and gravity automatically feeds them continuously onto the wire link conveyor belt 54 (FIG. 2).

For batch loading, the entry rack 24 (FIG. 2) may also be placed in a horizontal staging position by placing only the free wire ends 48, 50 into the support brackets 44, 46. The worker may place a batch (any suitable number) of food products on the horizontal entry rack 24 when in this staging position. When the worker is ready to toast, he only has to raise the outer end of rack 24 to the loading position, as shown in FIG. 1. There the products slide under gravity off the rack 24 and onto the wire link conveyor belt 54.

Figure 3:
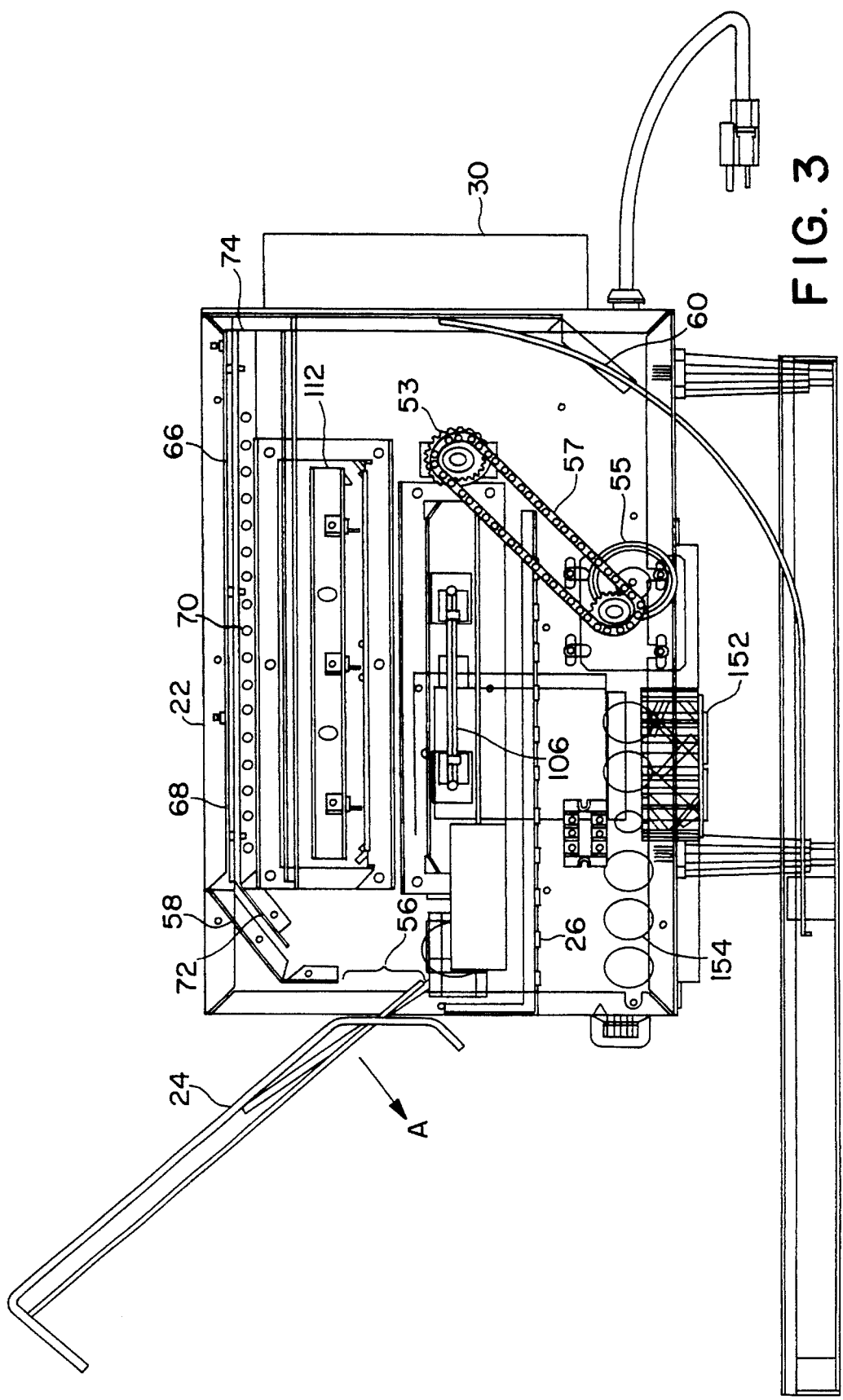
FIG. 3 is a cross sectional view of the inventive toaster.

The wire link conveyor belt 54 (FIG. 2 and 4) is formed by a number of wires which link together to form a belt which fits over sprocket wheels 53 on horizontal shafts (FIGS. 1, 4 and 9) at the front and back of the oven. These linked wires are preferred so that crumbs will fall through the belt 54 and into the crumb tray 26. The rear sprocket 53 wheels are driven by electric motor 55 (FIG. 3) acting through link chain 57.

The vertical space 56 (FIG. 2) between the wire link conveyor belt 54 and a deflector housing panel 58 is called the "throat" of the oven. The food products pass through this throat and onto the conveyor 54 when they enter the oven. Then, the wire link conveyor belt 54 transports the food products to the back of the oven with an in-oven dwell time selected to correctly toast the food product at the available speed selected by knob 40. The dwell time is manually set by speed control knob 40 (FIG. 1).

At the back of the wire link conveyor belt 54, the product falls from the conveyor and onto an exit rack 60 with a curved shape so that products falling onto the exit rack slide forward and onto a return tray 62. The worker can pick up the toasted product from the tray 62.

A downwardly directed air curtain (represented by Arrow A) is formed at the front of the oven (FIG. 3) in order to pre-dry food products so that they toast faster, to trap the hot air inside the toaster oven, and to direct any heated air which escapes the oven downwardly and away from the face of the worker. The air curtain is formed by a horizontal plate 66 which is held in a spaced parallel relationship with respect to the top panel of the oven housing 22 in order to create a horizontal air flow space 68. This air flow helps cool the top of this housing. Pressurized air enters the air flow space 68 via a row of holes 70 along a top edge of an inner panel 84, 86 (FIG. 4) on each side of the oven.

At the front of this horizontal air flow space, the top housing panel is bent downwardly to provide an air deflector panel 58. The front end of horizontal plate 66 is also bent downwardly at 72 in order to extend the horizontal air flow space 68 into the downward direction of arrow A.

A row of holes 74 (FIG. 2) are formed at the back of the oven to create an air flow which causes a draft of air to wash under the top panel of the oven to provide some degree of cooling. While the top remains relatively hot (about 170° F.), it is at a far lower temperature than the temperature (about 250° F.) of predecessor ovens.

Figure 4:
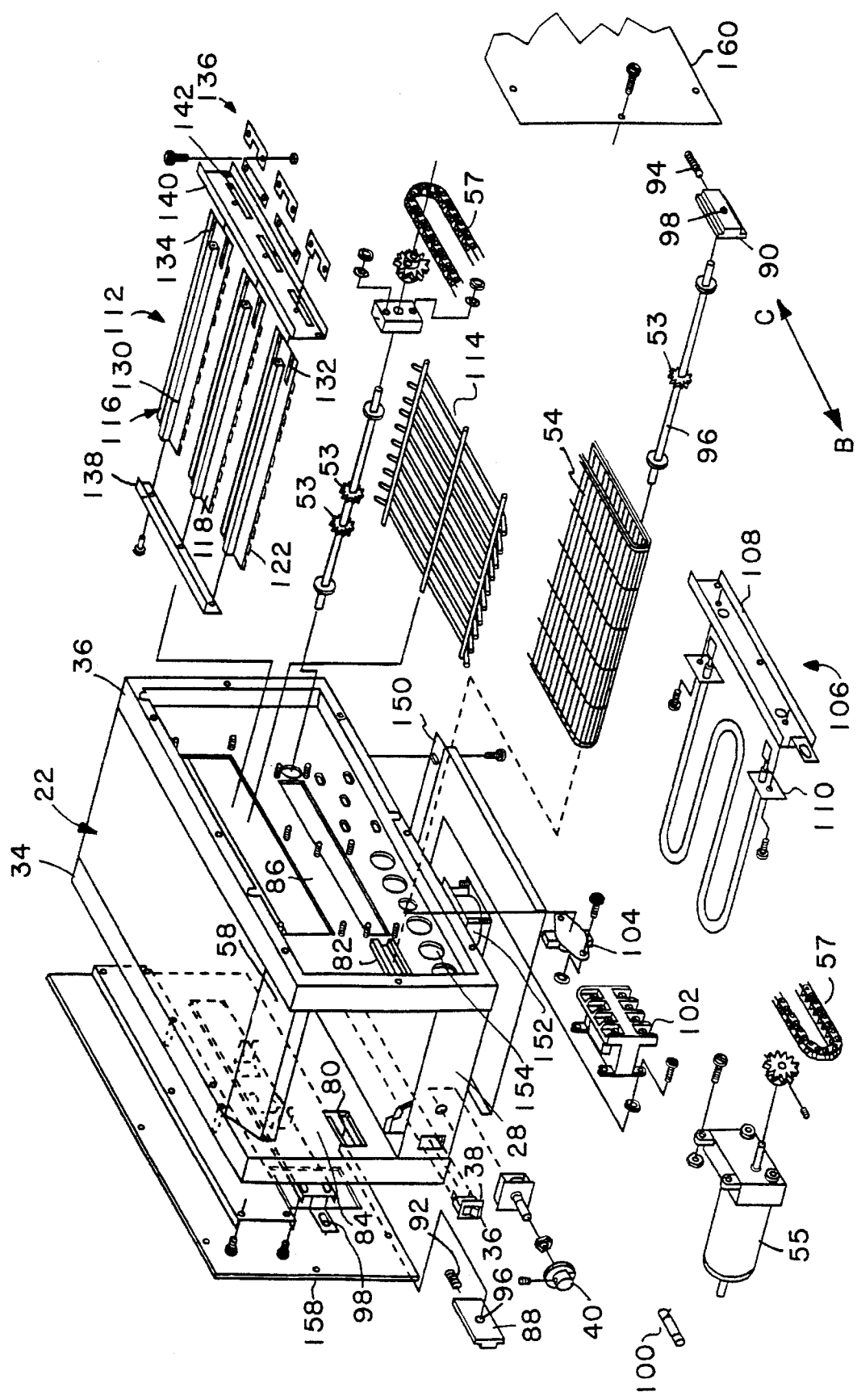
FIG. 4 is an exploded view of the inventive toaster.

The internal construction of the inventive toaster oven is best understood from the exploded view of FIG. 4. Many of the components in FIG. 4 have already been explained in connection with the foregoing description of the exterior of the oven. These components are identified by the same reference numerals and will not be explained a second time.

A pair of tracks 80, 82 are formed on the inside side walls 84,86 of the oven. A spring biased, sliding "Teflon" block 88, 90 is individually associated with and slidingly positioned within each of these tracks. The springs 92, 94 normally urge the blocks 88, 90 in a forward direction (Direction B); however, they may be manually slid back (Direction C) against the spring bias. The "Teflon" blocks contain bearing holes 96, 98 which receive the opposite ends of a shaft 96 carrying the wheels for supporting the front of wire link conveyor belt 54. The housing 22 has attached thereto opposed tabs (one of which is visible at 99), each including a hole for receiving and immobilizing an end of the shaft 96.

Therefore, to install or remove conveyor belt 54, shaft 96 is pushed back (Direction C) against the bias of spring 92. The shaft 96 is slid in the left-hand direction where its end is immobilized in hole 98. This places slack in conveyor belt 54 so that master wire links may be hooked or unhooked. When the shaft is slid out of the immobilizing hole 99, the bias of spring 92 again pushes block 88 forward and tensions the belt. Then, the process is repeated on the right-hand side of conveyor belt 54.

Item 100 is a fuse. Item 102 is a transformer. Item 104 is a thermal snap disk to open the circuit if an over heating condition should occur.

A "Cal-Rod" heating element 106 (FIGS. 4,5) is preferred for generating heat below wire link conveyor belt 54. The "Cal-Rod" unit 106 has no flat horizontal surfaces to catch crumbs which may fall through the wire link conveyor belt 54. Also, heat naturally rises and the food product to be toasted is above the "Cal-Rod" unit. Therefore, there is no reason for attempting to restrict the heat from the lower heating element 106. The "Cal-Rod" unit is secured to any suitable location on a plate 108, thereby enabling the manufacturer to make factory adjustments as to the distance between the "Cal-Rod" unit 106 and the bottom of the food product being carried by the wire link conveyor belt 54.

In this example, three heating elements 112 (FIGS. 4, 6, 7) extend across an area of the oven and are positioned above the wire link conveyor belt 54, in order to spread the heat uniformly and horizontally across the oven. The heating elements 112 extend in a transverse direction across the width of the conveyor belt 54; however, the direction is irrelevant as long as a uniform heat distribution is achieved. These heating elements 112 are protected by a rack 114 which is mounted between the food product carried on wire link conveyor belt 54 and heating elements 112. Hence, even if a worker incorrectly places an object which is too large on conveyor belt 54, it will not damage upper heating elements 112.

The construction of the individual heating elements 112 is shown at 116. The top side of the individual element 116 is oriented toward the top panel of housing 22 and is shown in FIGS. 6. The underside of element 116 is oriented toward the wire link conveyor belt 54 and is shown in FIG. 7. A card 118 made of heat resistant non-electrical conductive material provides a support for a ribbon strip heating element 120, which, in this example, is a 8.2 foot long and 0.0625×0.008 inch, 70-volt strip. The edges of support card 118 are crenelated to provide battlement-like projections, such as 122. The ribbon heater strip 120 is spot welded in place at its two ends 124, 126. Between these two ends, the ribbon heater strip 120 is wound back and forth across the underside of support card 118, looping over the battlement-like projections 122 of the crenelated edges. As best seen in FIG. 7, the battlement-like projections 122 are closer spaced at the edges than in the middle of card 118, a pattern selected for uniformly heating the oven considering that the outside walls of the oven tend to have a cooling effect.

This construction with the ribbon heater strip 120 on the underside of card 118 causes almost all heat from the ribbon heater strip 120 to radiated toward the food product and a relatively little amount of heat to radiated toward the top panel of the housing 22. Since crumbs fall downwardly under gravity, the large flat area of support card 118 is of no concern because it is above the food product. This is in contrast with the lower heater element 110 which has no flat surfaces because it is below the food product where crumbs do fall.

Staples 128 are added to help secure the metal conductor strips 132, 134 in place on card 118. A metal U-channel 130 supports the card 118 and prevents it from sagging. Metal conductor strips 132, 134 are positioned on the upper side of card 116 so that they will not come into electrical contact with the ribbon heating strip 120. These conductor strips 132, 134 provide electrical connections between a power source (not shown) and the opposite ends of the ribbon heating strip 120. The parts 136 (FIG. 4) are mica insulators.

Means are provided for adjusting the vertical dimension of the throat 56 (FIG. 3) at the input to the oven. In greater detail, brackets 138, 140 (FIG. 4) provide end supports for the upper heating elements 112 which slip into individually associated slots, such as 142. Within reason, these slots 142 may be formed almost any place across the width of bracket 140. Therefore, to manufacture a machine to toast tall or high products, such as muffins, the slots 142 are near the upper edge of bracket 140 (as viewed in FIG. 4), thus placing heating elements 112 high above the conveyor belt 54. For a low product, such as a slice of bread, the slots 142 are formed near the lower edge of the bracket 140, thus placing heating elements 112 near the conveyor. The rear support 138 is bolted to the housing at any location which matches the position of slots 142 in bracket 140 so that the heating elements are in a horizontal position.

The sides 34, 36 (FIG. 1) of the housing 22 having built in air flow chambers for conveying cool air in order to reduce the heat somewhat at the housing side panels which a worker may touch.

The path for the "cooling" air may be traced best in FIG. 4. A lower panel 150 of the housing 22 has an electric fan 152 which draws cool ambient air from below the housing 22 and blows it upwardly against the top of the control panel 28 (FIG. 2). The air passes through a series of holes (one of which is numbered 154) at the bottom front half of inner housing side wall 86. This hole position creates an air flow path wherein cool intake air first bathes the control components 38, 40 and 42 mounted on control panel 28.

After the air passes through holes 154, it fills the air flow chambers 34, 36 formed in the space between inner housing side walls 84, 86 and the outer housing walls 158, 160. The air in these air flow chambers passes through holes 70 (FIG. 3) at the tops of inside housing side walls 84, 86 and enters into the top cooling space 68 between horizontal plate 66 and the top of the toaster oven. From there, some small portion of the air exits holes 74 (FIGS. 2, 3) at the back of the oven. However, most of the air exits as the air curtain A, at the front of the oven.

With the described air flow pattern, a relatively cool air washes the inside surfaces at the top and sides of the outer housing panels which might be touched by workers. While these panels are still quite hot (some times about 170° F.) their temperature is such that a person with normal reflexes will not be seriously burned, if at all. In fact, most people suffer little or no damage because their reflexes remove their hands before a serious burn can occur. In prior toaster ovens, anyone touching the oven (about 250° F.) would very likely receive a serious burn even if he has superior reflexes.

Those who are skilled in the art will readily perceive how to modify the invention. Therefore, the appended claims are to be construed to cover all equivalent structures which fall within the true scope and spirit of the invention.

The claimed invention is:

1. A toaster oven comprising at least a rotatable shaft having opposite ends mounted on and turning in individually associated spring loaded bearing blocks, an endless wire link conveyor belt loop trained over said shaft, said conveyor belt extending through said oven in order to convey a food product through said oven, means responsive to an urging of said shaft against a bias of said spring loaded bearing block for temporarily causing slack in said conveyor belt, means for hooking and unhooking opposite ends of said belt to form said endless conveyor belt loop around said rotatable shaft while said slack is present, whereby said belt may be installed, removed, and replaced while said slack is present, and heater means for toasting a food product resting on said conveyor belt while said food product is being conveyed through said oven.

2. The toaster oven of claim 1 wherein said spring loaded bearing blocks comprising a pair of oppositely disposed tracks formed on opposite sides of a housing of said oven, a pair of structures each providing a bearing for an end of said shaft, said pair of structures being mounted to slide over individually associated ones of said tracks, a pair of springs mounted to urge individually associated ones of said structures in a direction which tensions said endless conveyor belt loop, and means adjacent said track for releasable capturing said shaft when urged against said spring bias, thereby holding said shaft while said slack is present.

3. The toaster oven of claim 1 wherein said heater means comprise upper and lower heating elements located above and below said conveyor belt, said heating elements being located to extend heat uniformly across an area of said oven, the upper of said heating elements comprising at least one horizontally mounted card having opposed crenelated edges, a ribbon heater strip wound across one side of said card looping around projections forming said crenelated edges whereby substantial all heat generated by said ribbon heater strip is radiated from said one side of said card, and means for supporting said upper heating means at a selected one of a plurality of optional positions above said conveyor belt with an orientation which directs said radiated heat toward said conveyor belt whereby said heating means can accommodate different types of food products.

4. The toaster oven of claim 3 wherein said lower heating means is located between feed and return of said conveyor belt, and said lower heating means is a rod-like element having a surface which does not catch or collect crumbs falling from said conveyor belt.

5. The toaster oven of claim 1 and an upper heating element at a location over said conveyor belt so that said food product passes between said upper heating element and said conveyor belt, and means for placing and supporting said upper heating means at any selected one of a plurality of vertical locations above said conveyor belt to accommodate a height of a food product, conveyed by said conveyor belt.

6. The toaster oven of claim 1 and a housing; an open throat at an entrance to said housing; said endless wire link conveyor belt conveying food products from said throat through said oven, an air flow chamber located on each of opposite sides of said housing; a top cooling chamber located at the top of said housing, said top cooling chamber ending with deflectors at one end of said top cooling chamber and over said open throat, said deflectors being aimed somewhat toward said open throat of said housing; means for driving air into said housing at a location below said wire link conveyor belt; an air flow path for said driven air, said air flow path extending from bottoms of said air flow chambers, up said air flow chambers and into said top cooling chamber, and through said top cooling chamber toward said deflectors for directing an air curtain downwardly over said open throat at the entrance of said housing.

7. The toaster oven of claim 1 and means for adjusting a speed at which said conveyor belt conveys food through said oven in order to select a dwell time for food products in said oven, said dwell time being the time period required to toast said food product.

8. A conveyor toaster oven comprising a housing having at least outer housing panels; an open throat at an entrance to said housing; an air flow chamber located on opposite sides of said housing; a top cooling chamber located at the top of said housing, said top cooling chamber ending with deflectors at one end of said top cooling chamber and over said open throat, said deflectors being aimed somewhat toward said open throat of said housing; means for driving air into said housing at a starting location for an air flow path extending from bottoms of said air flow chambers, up through said air flow chambers and into said top cooling chamber, and on through said top cooling chamber toward said deflectors for directing an air curtain downwardly over said open throat at the entrance of said housing, said air flow washing inside surfaces of housing panels which may be touched by workers, means for conveying food products from said throat through said oven, and means for toasting said food products while being conveyed through said oven.

9. The conveyor of claim 8 and means for varying a dwell time required for said conveying means to convey said food products through said oven.

10. The conveyor toaster oven of claim 8 and means for selecting between continuously loading said food products and batch loading said food products.

11. The conveyor toaster oven of claim 10 wherein said selecting means comprises a loading rack, means for supporting said loading rack in front of said throat in either a loading position or a staging position, said loading position continuously feeding food products onto said conveying means and said staging position receiving a batch of said food products, and means responsive to a moving of said loading rack from said staging position to said loading position for feeding said batch of said food products onto said conveying means.

12. The conveyor toaster of claim 11 wherein a mounting bracket is attached to said housing on each of opposite sides of said throat, each of said mounting brackets having a hole formed therein, said loading rack having a pair of wires with ends that fit into said holes for supporting said loading rack while in said staging position, and each of said pair of wires having an off set section which rests on said brackets when said loading rack is in said loading position.

13. The conveyor toaster of claim 8 wherein said conveying means comprises at least a rotatable shaft having opposite ends mounted on and turning in individually associated spring loaded bearing blocks, said spring loaded bearing blocks comprising a pair of oppositely disposed tracks formed on opposite sides of panels forming interior sides said housing, a pair of structures, each of said structures providing a bearing for an individually associated end of said shaft, said pair of structures being mounted to slide over individually associated ones of said tracks, said conveying means including an endless a wire link conveyor belt loop trained over said shaft, a pair of springs mounted to urge individually associated ones of said structures in a direction which tensions said endless conveyor belt loop, means responsive to an urging of said shaft against a bias of said spring loaded bearing block for temporarily causing slack in said conveyor belt, means for hooking and unhooking opposite ends of said belt to form said endless conveyor belt loop around said shaft while said slack is present, whereby said belt may be installed, removed, and replaced while said slack is present, and means on said housing adjacent each of said tracks for releasable capturing said shaft when urged against said spring bias, thereby holding said shaft while said slack is present.

14. A conveyor toaster oven comprising a housing containing an oven, an open input throat at a front of said housing for giving entrance into said oven; said housing having air flow chambers on each side of said oven, a top cooling chamber above said oven; a fan on the bottom of said oven for directing a stream of air into said oven, out said oven through said air flow chambers, and on into said top cooling chamber; means at said front of said oven for directing said stream of air out said top cooling chamber and downwardly as an air curtain over the front of said open throat for retaining heat within said oven; a pair of spaced parallel shafts extending traversely across a front and rear, respectively, of said oven, an endless wire link belt trained over said pair of shafts; an exit rack at the back of said oven for returning said food products to the front of said oven; means for driving said endless belt in order to convey food products entering said oven at said open throat through said oven to said exit rack; means in said oven for toasting said food products while they are being conveyed through said oven; means for supporting said toasting means at a selected height above said conveyor, whereby said selected height may be adjusted in order to accommodate physical characteristics of said food products; and means for either batch loading or continuously loading said food products onto said endless wire link conveyor belt.

15. The conveyor toaster oven of claim 14 wherein said loading means comprises a rack at said throat of said oven, said rack having two positions for staging and loading food products, respectively, and means responsive to said position of said rack for selectively batch loading or continuously loading said food products onto said oven.

16. The conveyor toaster of claim 14 and means for adjusting the speed at which said endless belt is driven in order to vary the dwell time of a food product while in said oven.

* * * * *